(No Model.)

J. P. ADAIR.
CULTIVATOR.

No. 548,107. Patented Oct. 15, 1895.

Witnesses:
Geo. E. Frech.
James W. Benard

Inventor.
J. P. Adair,
By Pattison & Nesbit,
Attorneys.

UNITED STATES PATENT OFFICE.

JAMES P. ADAIR, OF CARNESVILLE, GEORGIA.

CULTIVATOR.

SPECIFICATION forming part of Letters Patent No. 548,107, dated October 15, 1895.

Application filed July 2, 1895. Serial No. 564,723. (No model.)

*To all whom it may concern:*

Be it known that I, JAMES P. ADAIR, of Carnesville, in the county of Franklin and State of Georgia, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

This invention has reference to improvements in cultivators, the object being to provide an improved adjustable frame for carrying the shovels.

The invention consists in the novel features of construction hereinafter fully described and claimed, and illustrated by the accompanying drawings, in which—

Figure 1:
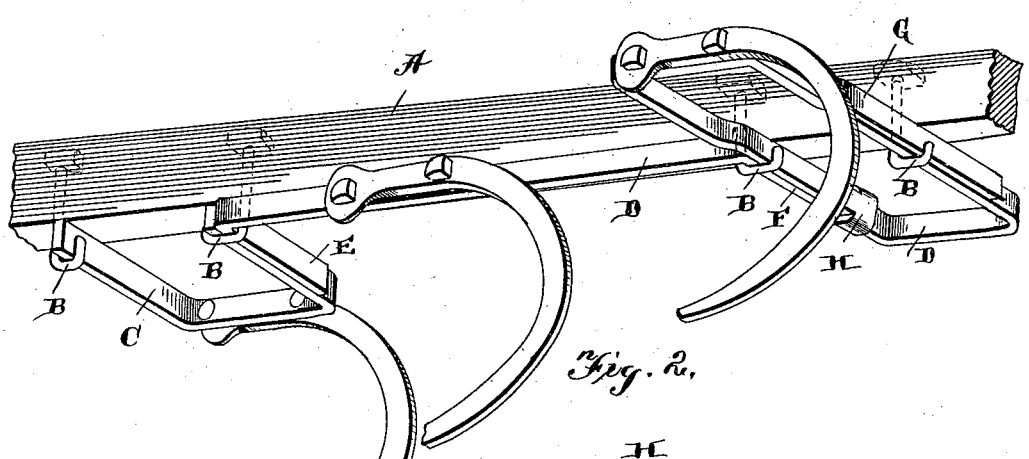
Figure 2:
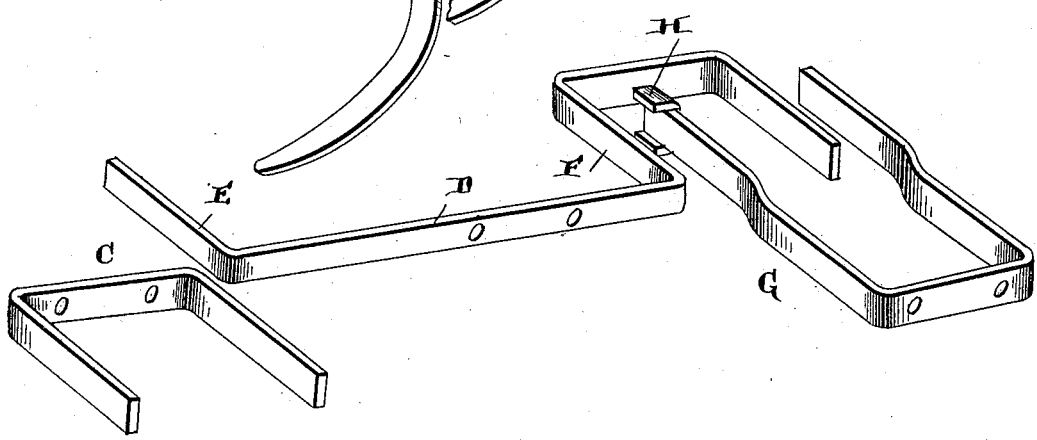

Figure 1 is a perspective view of the invention. Fig. 2 is a view of the portions of the frame detached.

A designates the center beam of the cultivator, and B a series of adjustable hooks for clamping the frame to the under side thereof. The forward portion of this frame consists of the horizontal U-shaped portion C, adjustable laterally in the hook B, while the center and rear portion of the frame are formed of a single piece of iron D, bent in the form shown to form at its forward portion a support for the stock E, while its rear portion is bent outward laterally, as indicated at F, to form a support for another of the stocks. A U-shaped piece G, of the same spread as the piece F, extends in an opposite lateral direction from said last-named piece and is secured at the desired adjustment by the same hook B that confines portions E and F in position. On the inner end of one of the arms G is a pocket or guide H for securely holding together the portions D and F.

To the lateral projections or supports formed by this frame I secure the shovel-stocks, as shown, and it will be understood that by moving the portions of the frame toward or away from the beam after loosening the hooks and removing the bolts uniting the parts of the frame I am enabled to give the cultivator the proper spread according to the work in hand.

Having thus fully described my invention, what I claim as new, and desire to secure by Letters Patent, is—

1. A cultivator comprising a beam, the shovel carrying stocks, the frame for supporting the latter consisting of a U-shaped portion at one end of the beam, a central portion having its forward end extending parallel with and overlapping an arm of the said U-shaped portion, the opposite end of the central portion formed into a U-shaped portion at the opposite end of and on one side of the beam, a U-shaped portion on the opposite side of the beam, the ends of said portions overlapping, and a means for adjustably securing the frame to the beam, substantially as shown and described.

2. In a cultivator, the combination of the beam, the shovel carrying stocks, and the frame for supporting the latter consisting of a forward U-shaped portion C, central and rear overlapping portions D, F and G, and a means for confining the same to the beam, substantially as shown and described.

3. A cultivator comprising a beam, the shovel stocks, the supports F and G, a means for securing the same to the beam, and a guide H formed integral with one arm of portion G for engaging portion F, for the purpose substantially as described.

In testimony whereof I affix my signature in presence of two witnesses.

JAMES P. ADAIR.

Witnesses:
 DANL. McKENZIE,
 J. M. PHILLIPS.